United States Patent
Jang et al.

(10) Patent No.: US 10,875,508 B2
(45) Date of Patent: Dec. 29, 2020

(54) VEHICLE TRAVELING ASSISTANCE METHOD AND VEHICLE TRAVELING ASSISTANCE DEVICE

(71) Applicant: Nissan Motor Co., Ltd., Yokohama (JP)

(72) Inventors: Hwaseon Jang, Kanagawa (JP); Takashi Sunda, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/624,592

(22) PCT Filed: Jun. 26, 2017

(86) PCT No.: PCT/JP2017/023428
§ 371 (c)(1),
(2) Date: Dec. 19, 2019

(87) PCT Pub. No.: WO2019/003280
PCT Pub. Date: Jan. 3, 2019

(65) Prior Publication Data
US 2020/0122697 A1 Apr. 23, 2020

(51) Int. Cl.
| B60T 7/12 | (2006.01) |
| B60T 8/00 | (2006.01) |
| G05D 1/00 | (2006.01) |
| B60T 7/00 | (2006.01) |
| B60W 30/00 | (2006.01) |
| B60W 30/02 | (2012.01) |
| B61L 3/00 | (2006.01) |
| B60T 8/174 | (2006.01) |

(Continued)

(52) U.S. Cl.
CPC .......... *B60T 8/174* (2013.01); *B60T 7/12* (2013.01); *B60T 8/172* (2013.01); *G05D 1/0088* (2013.01); *G05D 1/0223* (2013.01); *B01L 3/00* (2013.01); *B60W 30/00* (2013.01); *G05D 2201/0213* (2013.01)

(58) Field of Classification Search
CPC ...... B60T 7/00; B60T 7/12; B60T 8/00; G05D 1/00; B60W 30/00; B60W 30/02; B61L 3/00
See application file for complete search history.

(56) References Cited

U.S. PATENT DOCUMENTS 3,287,555 A * 11/1966 Livingston ............... B61L 3/221
246/187 B
8,579,764 B2 * 11/2013 Morita .................. B60W 10/06
477/173

(Continued)

FOREIGN PATENT DOCUMENTS

| JP | 2011-88551 A | 5/2011 |
| JP | 2011098690 A | 5/2011 |

(Continued)

*Primary Examiner* — Yonel Beaulieu
(74) *Attorney, Agent, or Firm* — Young Basile Hanlon & MacFarlane, P.C.

(57) ABSTRACT

A vehicle traveling assistance method in which a braking timing of a vehicle in manual driving is learned and traveling in automatic driving is assisted based on the learned braking timing, includes activating a brake in the automatic driving such that a timing at which a driver senses a braking operation is earlier than the learned braking timing.

8 Claims, 9 Drawing Sheets

(51) Int. Cl.
    *B60T 8/172*     (2006.01)
    *G05D 1/02*     (2020.01)
    *B01L 3/00*     (2006.01)

(56) References Cited

U.S. PATENT DOCUMENTS

| | | | |
|---|---|---|---|
| 2003/0030555 A1* | 2/2003 | Cole | B60Q 1/444 340/479 |
| 2007/0216222 A1* | 9/2007 | Miyazaki | B60T 8/172 303/155 |
| 2012/0083389 A1* | 4/2012 | Morita | B60W 10/02 477/185 |
| 2015/0039198 A1* | 2/2015 | Takeuchi | B60T 8/17555 701/70 |
| 2019/0171204 A1* | 6/2019 | Jang | B60W 30/16 |

FOREIGN PATENT DOCUMENTS

| | | |
|---|---|---|
| JP | 2011-121509 A | 6/2011 |
| JP | 2015-89801 A | 5/2015 |
| KR | 20150045164 A | 4/2015 |

* cited by examiner

DRIVER A

FIG. 5B

DRIVER B

| LEARNING DATA | DRIVING SENSITIVITY | |
|---|---|---|
| DATA VARIATION | LARGE | LOW |
| | SMALL | HIGH |
| PEDAL OPERATION FREQUENCY | HIGH | LOW |
| | LOW | HIGH |
| FREQUENCY OF ACCELERATION CHANGE | HIGH FREQUENCY | LOW |
| | LOW FREQUENCY | HIGH |

…

VEHICLE TRAVELING ASSISTANCE METHOD AND VEHICLE TRAVELING ASSISTANCE DEVICE

TECHNICAL FIELD

The present invention relates to a vehicle traveling assistance method and a vehicle traveling assistance device.

BACKGROUND

Japanese Patent Application Publication No. 2015-89801 discloses a technique in which a driving operation in manual driving is learned in association with an environment and, in automatic driving, automatic driving control suiting the preference of the driver is executed based on the result of the learning.

SUMMARY

However, in the conventional example disclosed in Japanese Patent Application Publication No. 2015-89801, since the preference of the driver is learned and the result of this learning is merely reflected in the automatic driving, the driver sometimes senses that activation of the brake is late in the automatic driving, and thus feels uneasy.

The present invention has been made to solve such a conventional problem and an object thereof is to provide a vehicle traveling assistance method and a vehicle traveling assistance device which can reduce uneasiness felt by a driver.

In an embodiment of the present invention, a braking timing of a vehicle in manual driving is learned and a brake is activated in automatic driving such that a timing at which a driver senses a braking operation is earlier than the learned braking timing.

According to one aspect of the present invention, since the braking can be executed at a timing appropriate for the driver, the uneasiness felt by the driver can be reduced.

DETAILED DESCRIPTION

An embodiment of the present invention is described below with reference to the drawings.

Description of First Embodiment

Figure 1:
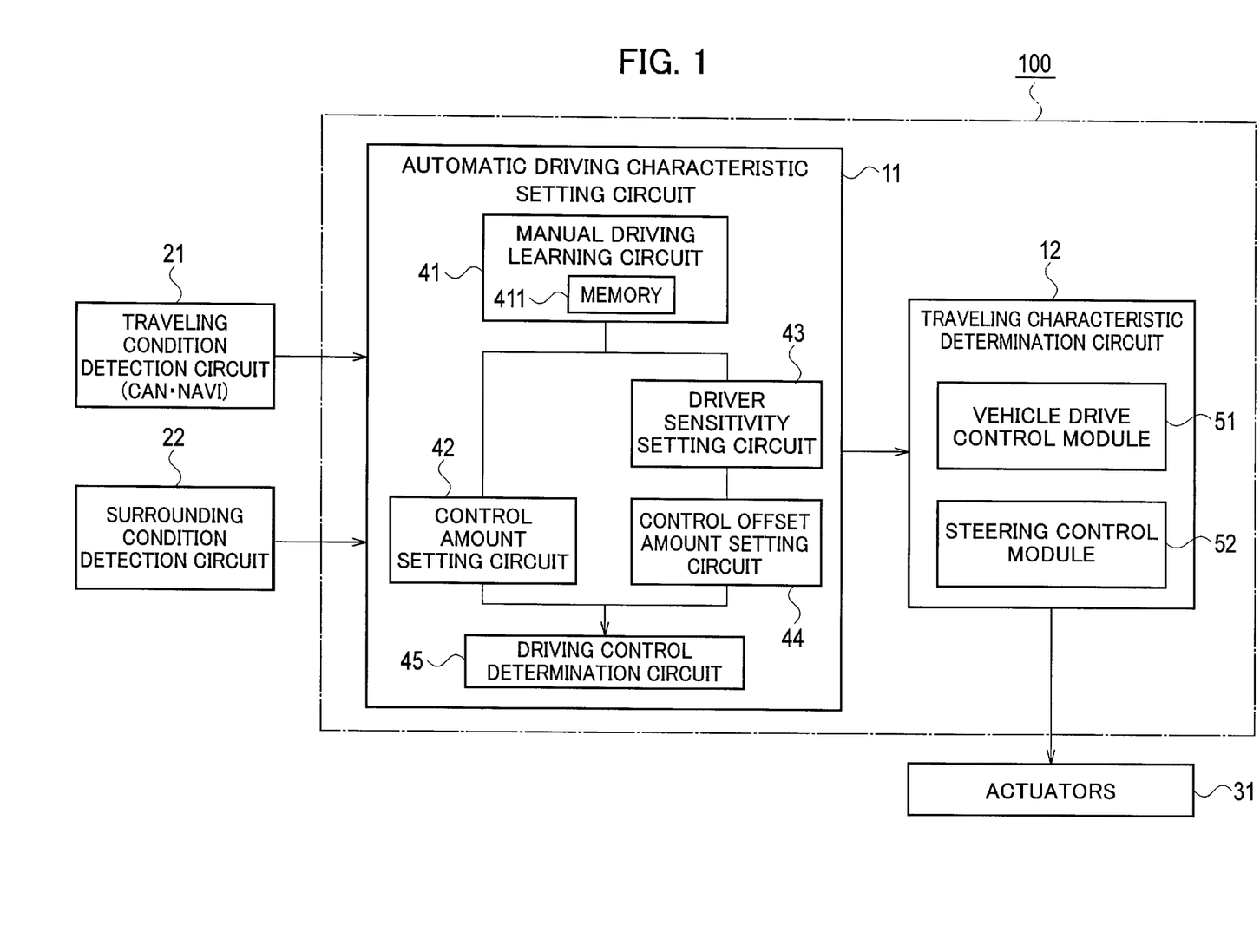
FIG. 1 is a block diagram illustrating configurations of a vehicle traveling assistance device and its peripheral devices according to an embodiment of the present invention.

FIG. 1 is a block diagram illustrating configurations of a traveling assistance device and its peripheral devices according to the embodiment of the present invention.

The traveling assistance device 100 is a controller which learns a driving operation of a driver in manual driving in a vehicle switchable between manual driving by the driver and automatic driving and which executes processing of applying the thus-obtained learning result or a learning result obtained based on data relating to actions of the driver or the like to traveling control in the automatic driving. The traveling assistance device 100 is connected to a traveling condition detection circuit 21, a surrounding condition detection circuit 22, and various actuators 31.

Note that automatic driving in the embodiment refers to a state where at least an actuator of a brake among actuators of, for example, the brake, an accelerator, a steering, and the like is controlled without an operation of the driver. Accordingly, the other actuators may be activated by the operation of the driver. Moreover, automatic driving only needs to be a state where any of controls of an acceleration-deceleration control, a lateral position control, and the like is executed.

Note that manual driving in the embodiment refers to a state where a driver performs at least an operation of the brake among operations necessary for traveling such as, for example, operations of the brake, the accelerator, the steering, and the like.

The traveling assistance device 100 can be implemented by using a micro-computer including a CPU (Central Processing Unit), a memory, and an input-output unit. A computer program for causing the micro-computer to function as the traveling assistance device 100 is installed in the micro-computer and is executed. The micro-computer thereby functions as multiple information processing circuits included in the traveling assistance device 100. Note that, although an example in which the traveling assistance device 100 is implemented by software is described herein, the traveling assistance device 100 can be formed by preparing dedicated hardware for executing various information processes. An electronic control unit (ECU) used for other controls relating to the vehicle may serve also as the traveling assistance device 100. Although an example in which the traveling assistance device 100 is mounted in a vehicle is described in the embodiment, the configuration may be such that a communication device is installed in a vehicle and the traveling assistance device 100 is installed in an external server.

As illustrated in FIG. 1, the traveling assistance device 100 according to the embodiment includes an automatic driving characteristic setting circuit 11 and a traveling characteristic determination circuit 12.

The traveling condition detection circuit 21 detects traveling data indicating traveling states of the vehicle such as the braking operation, a control amount in the braking operation, an increase rate of the control amount in the braking operation, the accelerator operation, an operation frequency of a brake pedal, an operation frequency of an accelerator pedal, vehicle speed, acceleration, steering angle, presence or absence of a preceding vehicle, an inter-vehicle distance to the preceding vehicle, speed relative to the preceding vehicle, a current position, a display state of a directional indicator, a lighting state of a headlamp, an operation state of a wiper, and the like. For example, the traveling condition detection circuit 21 includes sensors provided in the brake pedal and the accelerator pedal, sensors which obtain behavior of the vehicle such as a wheel sensor and a yaw-rate sensor, a laser radar, a camera, an in-vehicle network such as CAN (Controller Area Network) used for communication of data obtained from the aforementioned sensors, and a navigation device.

The surrounding condition detection circuit 22 detects environment information indicating an environment around the vehicle such as the current position of the vehicle, a distance to a stop line provided in front of the vehicle on a road on which the vehicle is traveling, a speed limit of the road, a grade of the road, a display state of a traffic signal in front of the vehicle, distances to pedestrians and bicycles, the number of vehicles in front of the vehicle, and a distance to the preceding vehicle. For example, the surrounding condition detection circuit 22 is a camera, a laser radar, a navigation device, and the like mounted in the vehicle. Note that the surrounding condition detection circuit 22 includes a device which performs detection by road-vehicle communication and inter-vehicle communication.

The actuators 31 receive execution instructions outputted by the traveling characteristic determination circuit 12 and drive units such as the accelerator, the brake, and the steering of the vehicle.

Next, units forming the traveling assistance device 100 are described. The automatic driving characteristic setting circuit 11 includes a manual driving learning circuit 41, a control amount setting circuit 42, a driver sensitivity setting circuit 43, a control offset amount setting circuit 44, and a driving control determination circuit 45. The traveling characteristic determination circuit 12 includes a vehicle drive control module 51 and a steering control module 52.

The manual driving learning circuit 41 obtains the traveling data relating to the traveling states of the vehicle and surrounding condition data relating to surrounding conditions around the vehicle from the traveling condition detection circuit 21 and the surrounding condition detection circuit 22 and learns a driving operation of the driver in the manual driving. Moreover, the manual driving learning circuit 41 stores the learning data in a memory 411. The manual driving learning circuit 41 learns a timing of the braking operation of the vehicle as the driving operation to be learned. For example, while the vehicle is stopped or is traveling, the manual driving learning circuit 41 learns the braking timing in association with various traveling scenes such as the case where the vehicle is stopped at a stop position such as a stop line provided at an intersection or the like, the case where the vehicle is stopped behind a stopped preceding vehicle, and the case where the vehicle is traveling by following a preceding vehicle. Matters to be learned include a brake activation position which is a position where the brake is activated with respect to the stop position, the distance to the stop position, and behavior of the vehicle in the braking operation such as the vehicle speed, the acceleration, and the like in the activation of the brake.

The "braking timing" is a timing at which the driver operates the brake (brake pedal) and the brake is activated, a timing at which the deceleration acts on the vehicle, a timing at which the operation of the accelerator is terminated, or a timing at which the operation of the brake pedal is started when the host vehicle is to be stopped at the stop position. Alternatively, the "braking timing" may be a timing at which the operation amount (stepping amount) of the brake pedal by the driver reaches or exceeds a predetermined amount set in advance or a timing at which the operation amount (stepping amount) of the accelerator pedal by the driver reaches or falls below a predetermined amount set in advance.

As another alternative, the "braking timing" may be a timing at which the driver operates the brake and the control amount in the braking operation reaches a certain value set in advance or a timing at which an increase rate in the control amount in the braking operation reaches a certain value. Specifically, a timing at which predetermined speed reduction by the braking operation has not been achieved yet but the control amount of the brake or the increase rate of the control amount has reached a certain value may be set as the braking timing. Specifically, the braking timing is a concept including the timing at which the brake is activated (braking start timing), the timing of letting go of the accelerator (braking start timing), the timing at which the control amount of the brake reaches a certain value, and a timing at which the increase rate of the control amount of the brake reaches a certain value. In other words, the braking timing is a timing at which the driver senses the braking operation. Moreover, the brake in the embodiment includes a hydraulic brake, an electronically-controlled brake, and a regenerative brake. Note that the braking timing may include a state where the deceleration is acting even though the hydraulic brake, the electronically-controlled brake, or the regenerative brake is not active.

Specifically, when the vehicle is to be stopped at a stop position such as a stop line provided at an intersection, the manual driving learning circuit 41 obtains the traveling data and the surrounding condition data such as the distance from the host vehicle to the stop position, the traveling speed and deceleration of the host vehicle, and the inclination of the traveling road (uphill or downhill) from the aforementioned traveling condition detection circuit 21 or the surrounding condition detection circuit 22. Moreover, the manual driving learning circuit 41 learns the brake activation position (distance from the stop position) and the braking timing in this condition. The manual driving learning circuit 41 stores the learning data in the memory 411.

When a driving mode transitions from the manual driving to the automatic driving, the control amount setting circuit 42 sets control amounts for executing automatic driving based on the learning data learned by the manual driving learning circuit 41, the traveling data detected by the traveling condition detection circuit 21, and the surrounding condition data detected by the surrounding condition detection circuit 22. The control amounts to be set are the brake activation position, the braking timing, the deceleration, and the like in vehicle stop.

The driver sensitivity setting circuit 43 sets driving sensitivity of the driver for driving based on past driving operations of the driver learned by the manual driving learning circuit 41. The driving sensitivity in the embodiment refers to sensitivity of the driver to traveling. For example, there are drivers who recognize a change of several km/h in vehicle speed and perform a correction operation and drivers who don't. For example, there are drivers who frequently perform a correction operation to adjust the vehicle speed to target vehicle speed or vehicle speed limit as much as possible and drivers who don't and drivers who care about the vehicle speed deviating from the target vehicle speed or the vehicle speed limit and drivers who don't and the sensitivity for traveling varies depending on drivers. Setting the driving sensitivity as described above enables execution of appropriate control suiting each driver.

Specifically, the driver sensitivity setting circuit 43 determines the driving sensitivity of the driver based on variation of learning data on a desired driving operation of the driver, a frequency of pedal operation, a frequency in frequency analysis of acceleration data, and the like. The driving sensitivity of the driver can be set with a continuously changing numerical value. Alternatively, the driving sensitivity may be set with two values of "high" and "low." Moreover, the driving sensitivity may be set by using data on actions of the driver other than driving or data obtained based on a test for determining the driving sensitivity.

Figure 4A:
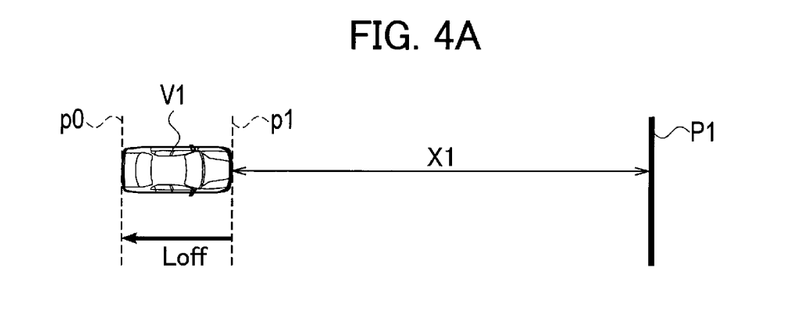
FIG. 4A is an explanatory view illustrating a distance from a stop position to a brake activation position and an offset amount Loff.

The control offset amount setting circuit 44 sets an offset amount in stopping of the vehicle in the automatic driving. For example, assume that a brake activation position p1 in the case where a host vehicle V1 is stopped at a stop position P1 in front of the host vehicle V1 as illustrated in FIG. 4A is obtained as the learning data in the manual driving. The control offset amount setting circuit 44 sets an offset amount Loff for this brake activation position p1. Moreover, the control offset amount setting circuit 44 sets the timing at which the host vehicle V1 reaches a position p0 as the braking timing. Furthermore, the higher the driving sensitivity of the driver set by the driver sensitivity setting circuit 43 is, the greater the offset amount Loff is set. The higher the vehicle speed is, the greater the offset amount Loff is set.

The driving control determination circuit 45 obtains the control amounts set by the control amount setting circuit 42 and furthermore corrects the control amounts based on the offset amount Loff set by the control offset amount setting circuit 44. Specifically, the driving control determination circuit 45 sets the offset amount Loff for the brake activation position p1 in the manual driving illustrated in FIG. 4A. Then, the driving control determination circuit 45 performs correction such that a position behind the brake activation position p1 by the offset amount Loff is set as the brake activation position. The corrected brake activation position is denoted by p0. Moreover, a time point at which the host vehicle V1 reaches the brake activation position p0 is set as the braking timing. Accordingly, in the automatic driving, the braking timing is set such that a timing at which the driver senses the braking operation is earlier than the braking timing learned in the manual driving.

Then, the driving control determination circuit 45 corrects the control amounts such that the braking is performed at the set braking timing, and outputs control signals to the traveling characteristic determination circuit 12.

The vehicle drive control module 51 of the traveling characteristic determination circuit 12 sends control signals to the actuators 31 of the accelerators and the brake in the automatic driving, based on the control signals sent from the driving control determination circuit 45. Specifically, the vehicle drive control module 51 has a function of a driving control circuit which obtains the braking timing learned in the manual driving and which operates the brake at such a timing that the user senses that the braking operation is performed at a timing earlier than the learned braking timing, in the automatic driving. The steering control module 52 sends the control signal to the actuator 31 of the steering in the automatic driving, based on a steering control signal sent from the driving control determination circuit 45.

Description of Operations in First Embodiment

Next, operations of the traveling assistance device 100 according to the first embodiment are described with reference to the flowcharts illustrated in FIGS. 2 and 3. First, in step S11 of FIG. 2, the manual driving learning circuit 41 determines whether the current driving mode is the manual driving or the automatic driving. In the case of the manual driving, in step S12, the manual driving learning circuit 41 obtains the various pieces of detection data on traveling conditions and surrounding conditions from the traveling condition detection circuit 21 and the surrounding condition detection circuit 22.

In step S13, the manual driving learning circuit 41 learns the brake activation position and the braking timing in the manual driving and, in step S14, stores the learning data. For example, the manual driving learning circuit 41 learns the brake activation position and the braking timing in the case where the host vehicle is to be stopped at a stop position at an intersection in front of the vehicle in the manual driving. Specifically, as illustrated in FIG. 4A, the manual driving learning circuit 41 learns the brake activation position and the braking timing when the host vehicle V1 is to be stopped at the stop position P1 at the intersection in the manual driving. In the example illustrated in FIG. 4A, since the brake is activated at the position p1 away from the stop position P1 by the distance X1, the manual driving learning circuit 41 learns the position p1 as the brake activation position. Moreover, the manual driving learning circuit 41 learns the timing at which the host vehicle V1 reaches the position p1 as the braking timing. The manual driving learning circuit 41 stores the learning data in the memory 411. Furthermore, the manual driving learning circuit 41 stores the traveling speed of the host vehicle V1, the information on the grade (uphill or downhill) of the traveling road, and the distance X1 from the host vehicle V1 to the stop position P1 in this case in the memory 411. Note that, although the example in which the host vehicle V1 is to be stopped at the stop position P1 is illustrated in FIG. 4A, a position away from a rear portion of the stopped preceding vehicle by a certain distance can be set as the stop position.

Furthermore, as described above, the manual driving learning circuit 41 can learn the operation amount (stepping amount) of the brake pedal or the operation amount (stepping amount) of the accelerator pedal as the braking timing. Specifically, the manual driving learning circuit 41 may learn the timing at which the driver operates the brake pedal and the operation amount (stepping amount) of the brake pedal reaches or exceeds the predetermined braking operation amount set in advance as the braking timing. Moreover, the manual driving learning circuit 41 may learn the timing at which the driver terminates the operation of the accelerator pedal and the operation amount of the accelerator reaches or falls below the predetermined accelerator operation amount set in advance as the braking timing.

In step S15, the manual driving learning circuit 41 determines whether the amount of the learning data stored in the memory 411 reaches a predetermined amount set in advance. When the amount of the learning data reaches the predetermined amount (YES in step S15), the processing of storing the learning data is completed.

When the processing of storing the learning data is completed and the manual driving learning circuit 41 determines that the driving mode is the automatic driving in the processing of step S11, in step S16, the control amount setting circuit 42 determines whether to stop the host vehicle at the stop position such as a stop line in the automatic driving. When the host vehicle is to be stopped (YES in step S16), in step S17, the control amount setting circuit 42 obtains the learning data on the brake activation position and the braking timing stored in the memory 411.

In step S18, the control amount setting circuit 42 sets the control amounts of the brake and the accelerator based on the learning data.

In step S19, the driver sensitivity setting circuit 43 executes processing of setting the driving sensitivity of the driver. The processing of setting the driving sensitivity of the driver is described below with reference to the flowchart illustrated in FIG. 3.

In steps S31, S33, and S35, the driver sensitivity setting circuit 43 determines the driving sensitivity (sensitivity for traveling) of the driver based on: (1) the variation of the learning data on the desired driving operation of the driver; (2) the frequency of the pedal operation; and (3) the frequency in the frequency analysis of acceleration data. The determination of the driving sensitivity of the driver based on aforementioned (1) to (3) is described below in detail.

Figure 5A:
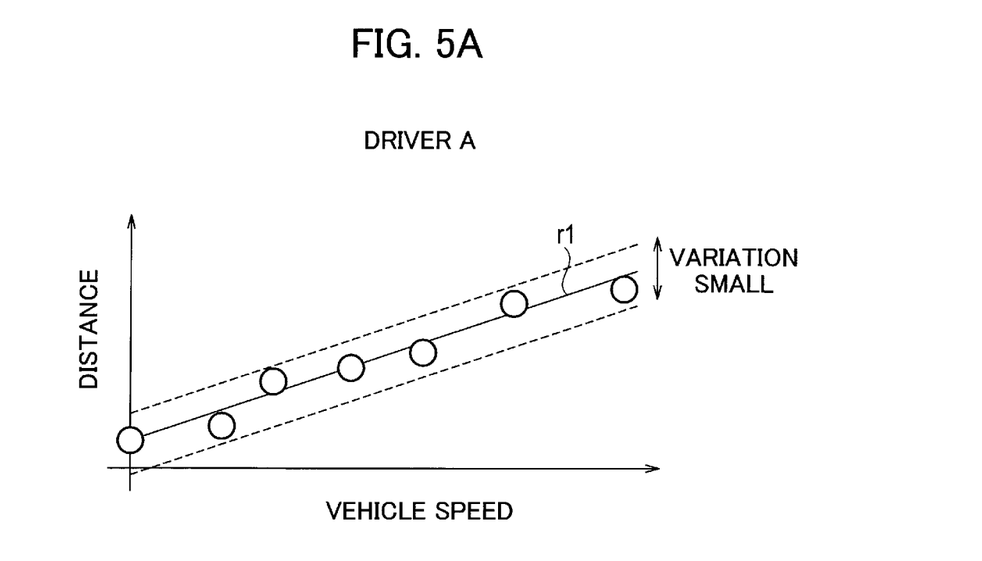
FIG. 5A is a graph illustrating learning data on relationships between vehicle speed and the distance from the stop position to the brake activation position and illustrates the case where variation is small.
Figure 5B:
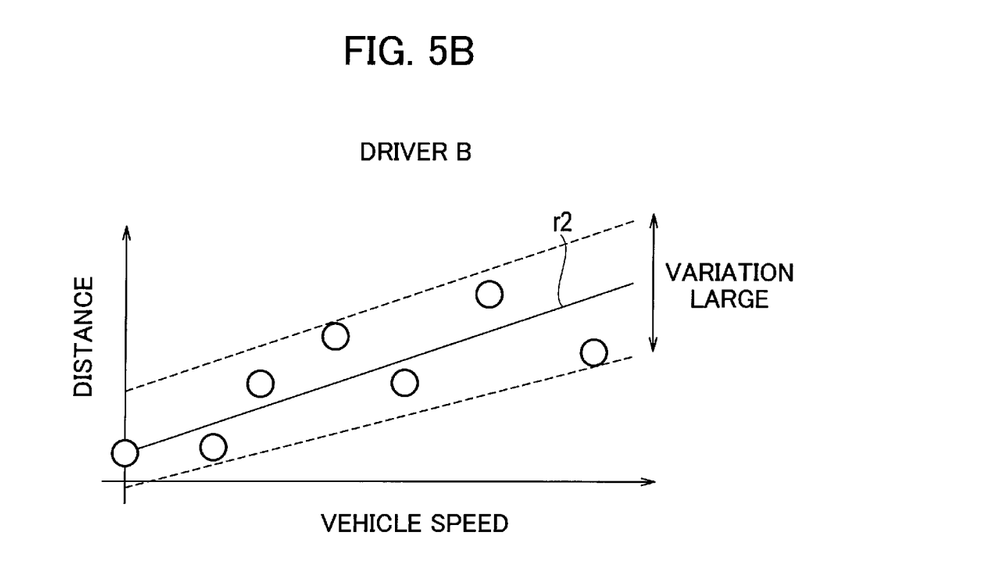
FIG. 5B is a graph illustrating the learning data on the relationships between the vehicle speed and the distance from the stop position to the brake activation position and illustrates the case where variation is large.

(1) Description of Driving Sensitivity Determination Based on Variation in Learning Data FIGS. 5A and 5B are graphs for explaining the determination of the driving sensitivity of the driver based on the variation of the learning data. FIG. 5A illustrates data on a driver A and FIG. 5B illustrates data on a driver B. The learning data as illustrated in FIGS. 5A and 5B can be obtained by, for example, learning the vehicle speed in the case where the host vehicle is to be stopped at the stop line and the distance to the stop line in the case where the brake is operated. In FIGS. 5A and 5B, the horizontal axes represent the vehicle speed and the vertical axes represent the distance from the host vehicle to the stop line. Symbols of circles in FIGS. 5A and 5B represent pieces of learning data. As apparent from FIGS. 5A and 5B, the relationship between the vehicle speed and the distance changes substantially linearly such that the higher the vehicle speed is, the greater the distance from the host vehicle to the stop line is.

Moreover, in FIG. 5A, each piece of learning data is located near a straight line r1 and the variation of the learning data is small. Accordingly, the driver sensitivity setting circuit 43 determines that the driving sensitivity of the driver A is high. Meanwhile, in FIG. 5B, each piece of learning data is far away from a straight line r2 and the variation of the learning data is large. Accordingly, the driver sensitivity setting circuit 43 determines that the driving sensitivity of the driver B is lower than that of the driver A. The determination of the variation can be performed also by calculating a standard deviation for each traveling speed from multiple pieces of learning data and determining that the greater the standard deviation is, the larger the variation is.

Figure 6A:
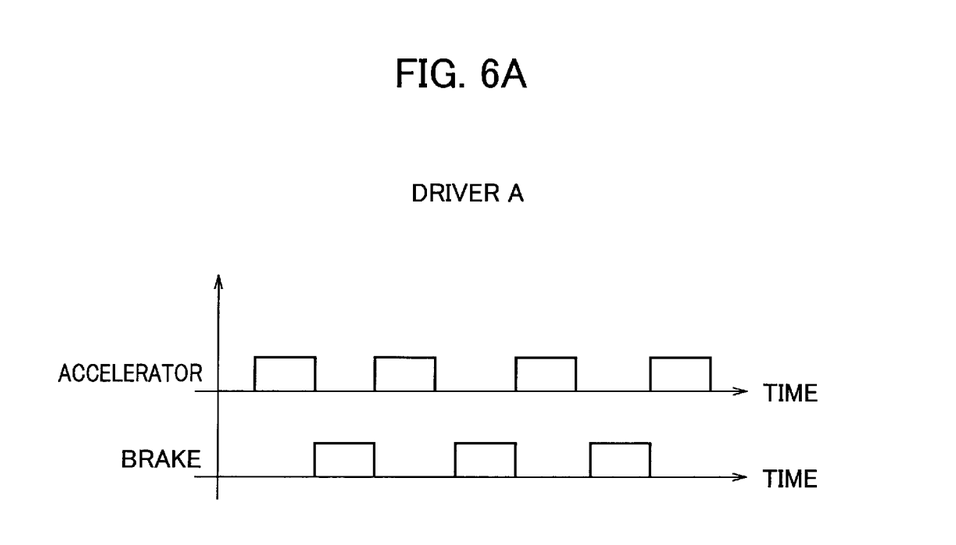
FIG. 6A is a graph illustrating learning data on relationships between the time and a frequency of a pedal operation and illustrates the case where the frequency of pedal operation is high.
Figure 6B:
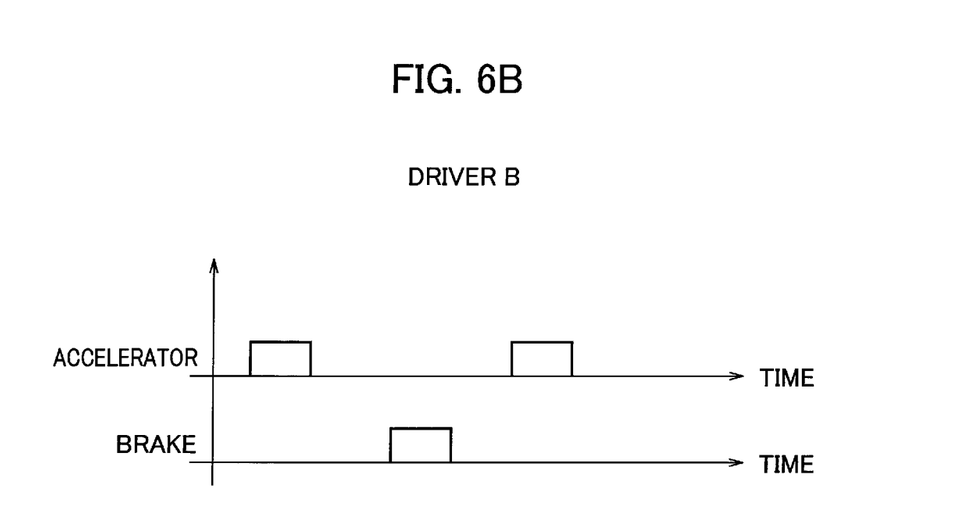
FIG. 6B is a graph illustrating the learning data on the relationships between the time and the frequency of the pedal operation and illustrates the case where the frequency of pedal operation is low.

(2) Description of Driving Sensitivity Determination Based on Frequency of Pedal Operation FIGS. 6A and 6B are diagrams for explaining the determination of the driving sensitivity of the driver based on the frequency of the pedal operation. FIG. 6A illustrates data of the driver A and FIG. 6B illustrates data of the driver B. These pieces of data are obtained from data on the operation frequency of each of the accelerator pedal and the brake pedal in traveling by the manual driving of the driver. The data can be obtained by the traveling condition detection circuit 21 illustrated in FIG. 1. For example, the configuration may be such that predetermined time is set and the number of times each of the accelerator pedal and the brake pedal is operated within this predetermined time is set as the operation frequency.

In FIGS. 6A and 6B, the horizontal axes represent time and the vertical axes represent the operations of the accelerator pedal and the brake pedal. It can be seen that the frequency of the pedal operation is higher in FIG. 6A than in FIG. 6B. The driver sensitivity setting circuit 43 determines that driver A with a high pedal operation frequency has high driving sensitivity. Meanwhile, the driver sensitivity setting circuit 43 determines that driver B with a low pedal operation frequency has lower driving sensitivity than the driver A. Setting of the driving sensitivity may be such that the higher the pedal operation frequency is, the higher the driving sensitivity is set or such that a threshold for the pedal operation frequency is set and the driving sensitivity is determined to be high when the pedal operation frequency is equal to or higher than the threshold and is determined to be low when the pedal operation frequency is lower than the threshold.

Figure 7A:
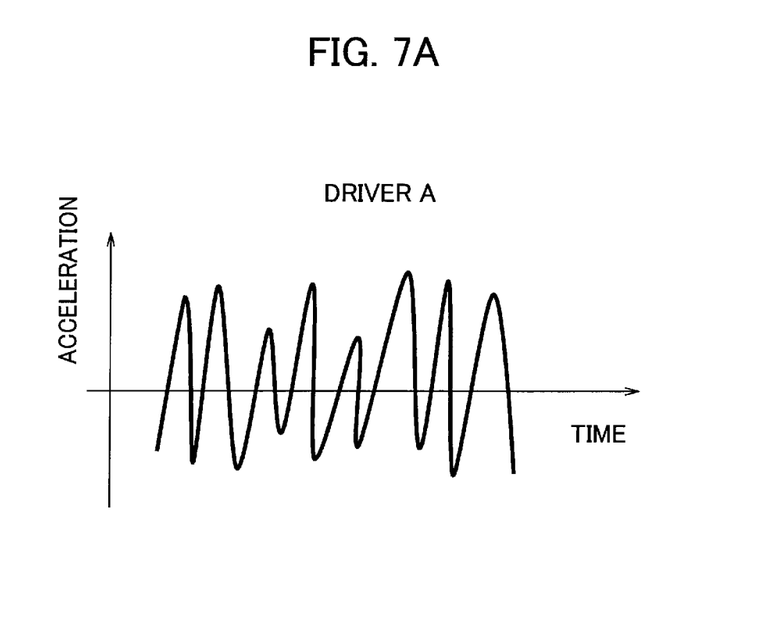
FIG. 7A is a graph illustrating learning data on acceleration changes in a front-rear direction of the vehicle over time and illustrates the case where the frequency of the acceleration changes is high.
Figure 7B:
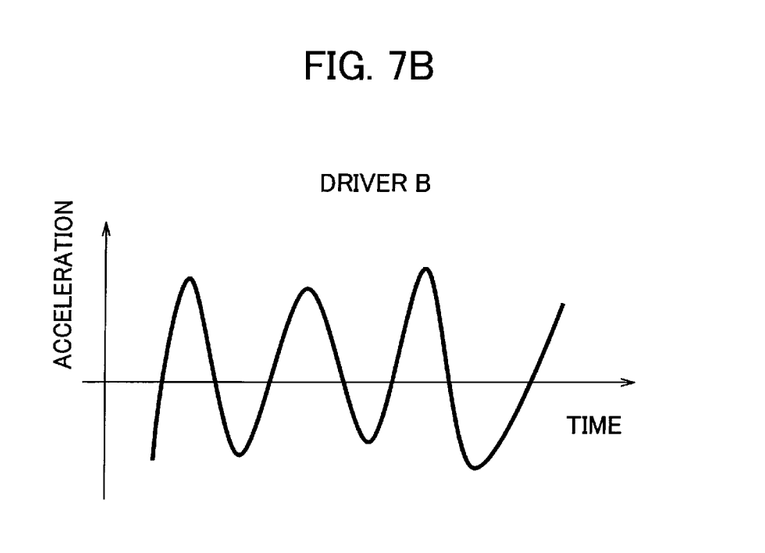
FIG. 7B is a graph illustrating the learning data on the acceleration changes in the front-rear direction of the vehicle over time and illustrates the case where the frequency of the acceleration changes is low.

(3) Description of Driving Sensitivity Determination Based on Frequencies in Frequency Analysis of Acceleration Data FIGS. 7A and 7B are graphs for explaining the determination of the driving sensitivity of the driver based on the frequency in the frequency analysis of the acceleration data. FIG. 7A illustrates data of the driver A and FIG. 7B illustrates data of the driver B. The acceleration data (acceleration data in a traveling direction) in traveling by the manual driving of the driver is obtained. This data can be obtained by the traveling condition detection circuit 21 illustrated in FIG. 1. For example, predetermined time is set and the acceleration data within this predetermined time is obtained.

Figure 8A:
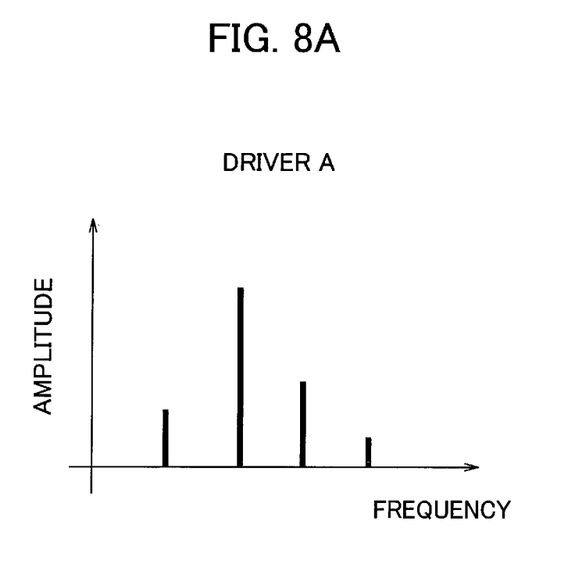
FIG. 8A illustrates a graph obtained by performing frequency analysis on the graph illustrated in FIG. 7A.
Figure 8B:
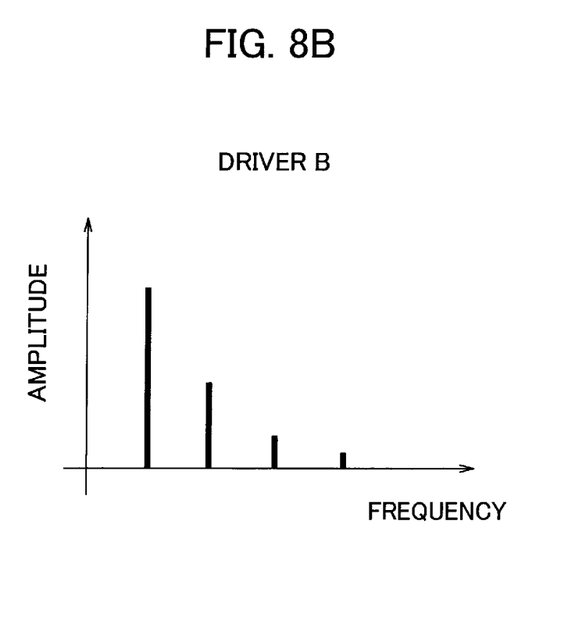
FIG. 8B illustrates a graph obtained by performing frequency analysis on the graph illustrated in FIG. 7B.

As illustrated in FIG. 7A, in the case of the driver A, many acceleration changes occur in the predetermined time. Meanwhile, in the case of the driver B, few acceleration changes occur in the predetermined time. Then, the frequency analysis is performed on the curves representing the acceleration changes and the frequency analysis results illustrated in, for example, FIGS. 8A and 8B are thereby obtained. FIGS. 8A and 8B illustrate the results obtained by performing the frequency analysis on the curves illustrated in FIGS. 7A and 7B, respectively. As apparent from FIGS. 8A and 8B, the result of the driver A includes more high frequency components. Then, the driver sensitivity setting circuit 43 determines that the more high frequency components there are, the higher the driving sensitivity is. Specifically, the driver sensitivity setting circuit 43 determines that the driver A has high driving sensitivity and determines that the driver B has lower driving sensitivity than the driver A. Note that the driver sensitivity setting circuit 43 may perform frequency analysis on speed data instead of the acceleration and determine the driving sensitivity of the driver based on the frequency in the frequency analysis.

Figure 10:
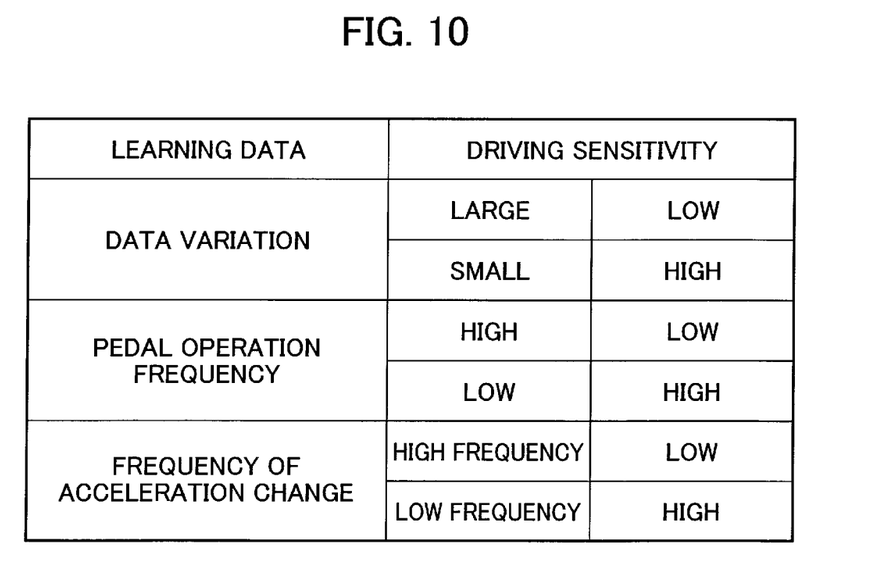
FIG. 10 is an explanatory table illustrating relationships between the data variation, the frequency of the pedal operation, the frequency of the acceleration changes, and the driving sensitivity of the driver.

A table illustrated in FIG. 10 is obtained by summarizing the contents of (1), (2), and (3) described above. The driving sensitivity detected in the processing of each of steps S31, S33, and S35 in FIG. 3 is subjected to predetermined weighting processing in a corresponding one of steps S32, S34, and S36.

Note that, although the aforementioned three examples are given as methods of determining the driving sensitivity of the driver, the configuration may be such that at least one of the three methods is executed. Alternatively, for example, it is possible to determine the driving sensitivity based on an action of the driver other than that in driving or perform a test for determining the driving sensitivity in advance and set the driving sensitivity of the driver based on the result of this test.

Moreover, in the determination of the driving sensitivity, it is possible to set, for example, five levels of numerical values, set a linearly-changing numerical value, or set two values of "high" and "low."

Figure 2:
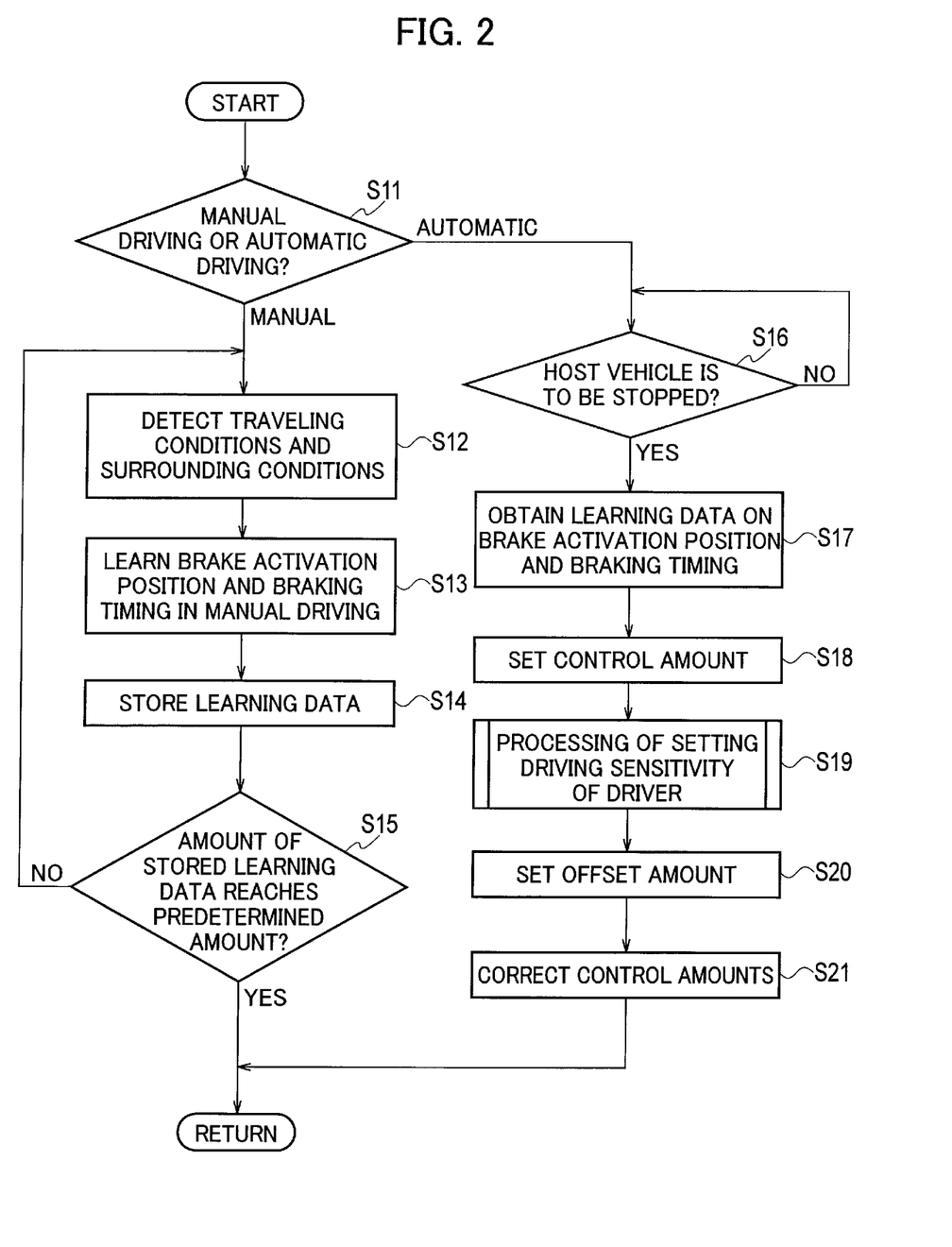
FIG. 2 is a flowchart illustrating processing steps of the vehicle traveling assistance device according to the embodiment of the present invention.
Figure 3:
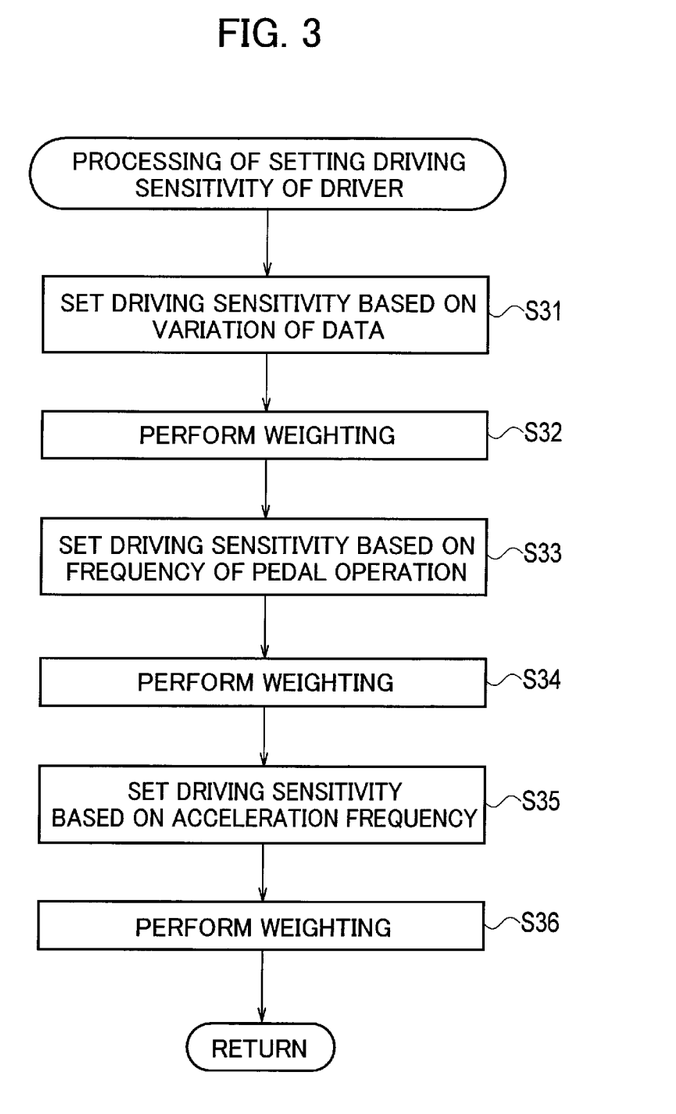
FIG. 3 is a flowchart illustrating processing of setting sensitivity of a driver in the vehicle traveling assistance device according to the embodiment of the present invention.

Thereafter, in step S20 illustrated in FIG. 2, the control offset amount setting circuit 44 sets the offset amount Loff based on the driving sensitivity of the driver. Specifically, as illustrated in FIG. 4A, the control offset amount setting circuit 44 sets the position (position on one side of the position p1 opposite to the position P1) p0 behind the position p1 by the offset amount Loff, the position p1 being the brake activation start position based on the learning data learned by the manual driving learning circuit 41.

Moreover, the control offset amount setting circuit 44 changes the offset amount Loff depending on the driving sensitivity of the driver set in the processing of step S19. Specifically, the higher the driving sensitivity of the driver is, the greater the offset amount Loff is set.

Figure 4B:
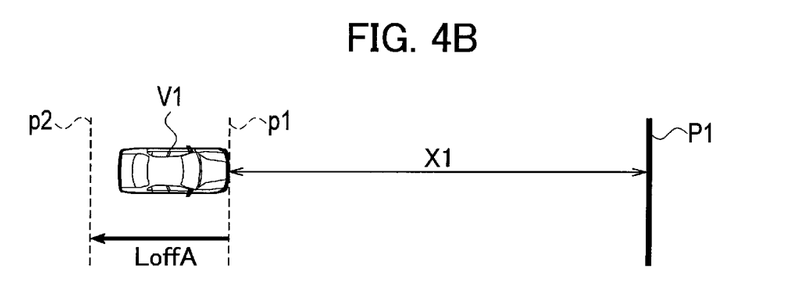
FIG. 4B is an explanatory view illustrating the distance from the stop position to the brake activation position and illustrates the case where the offset amount is great.

FIG. 4B is an explanatory view illustrating the brake activation position of the driver (driver A) determined to have high driving sensitivity and, in FIG. 4B, a position p2 behind the brake activation position p1 in the manual driving by an offset amount LoffA is set as the brake activation position. Then, a timing at which the host vehicle V1 reaches the brake activation position p2 is set as the braking timing. Specifically, the braking timing in the automatic driving is set such that the timing at which the driver senses the braking operation is earlier than the braking timing learned in the manual driving. Moreover, the higher the driving sensitivity is, the earlier the braking timing is set.

Figure 4C:
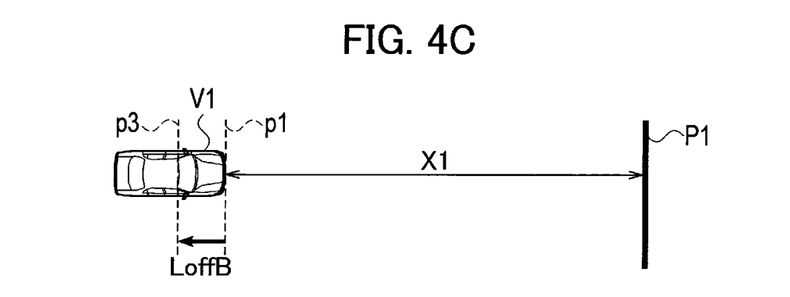
FIG. 4C is an explanatory view illustrating the distance from the stop position to the brake activation position and illustrates the case where the offset amount is small.

FIG. 4C is an explanatory view illustrating the brake activation position of the driver (driver B) having lower driving sensitivity than the aforementioned driver A and, in FIG. 4C, a position p3 behind the brake activation position p1 in the manual driving by an offset amount LoffB (LoffB<LoffA) is set as the brake activation position. Then, the timing at which the host vehicle V1 reaches the brake activation position p3 is set as the braking timing. Specifically, the braking timing in the automatic driving is set such that the timing at which the driver senses the braking operation is earlier than the braking timing learned in the manual driving. Moreover, since the driving sensitivity of the driver B for driving is lower than that of the driver A, the braking timing is set later than that for the driver A.

Figure 9:
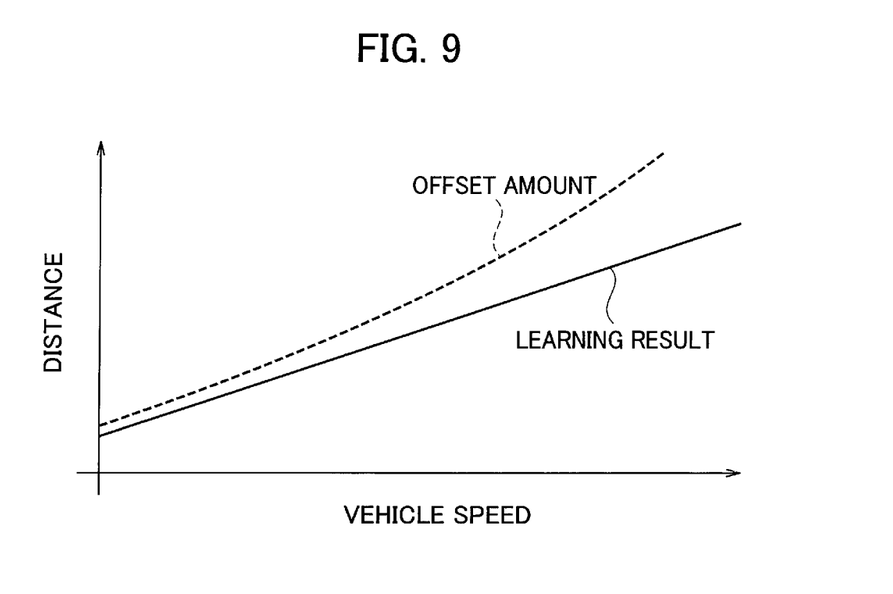
FIG. 9 is a graph illustrating relationships between the vehicle speed, the distance from the stop position to the brake activation position, and the offset amount.

Furthermore, FIG. 9 is a graph illustrating relationships between the vehicle speed and the offset amount. As illustrated in FIG. 9, the configuration may be such that the higher the vehicle speed is, the greater the offset amount is set.

Then, in step S21 of FIG. 2, the driving control determination circuit 45 corrects the control amounts set by the control amount setting circuit 42 by using the offset amount set by the control offset amount setting circuit 44 and outputs the corrected control amounts to the traveling characteristic determination circuit 12. Specifically, the driving control determination circuit 45 sets a position behind the brake activation position p1, obtained as the learning data in the manual driving, by the offset amount Loff (LoffA, LoffB) as the brake activation position in the automatic driving and sets the timing at which the host vehicle passes this brake activation position as the braking timing in the automatic driving.

Thereafter, the vehicle drive control module 51 of the traveling characteristic determination circuit 12 outputs a control instruction to the actuator of the brake or the accelerator based on the corrected control amounts. Accordingly, in the automatic driving, the braking timing can be set to be earlier than the timing at which the brake is activated in the manual driving by the time corresponding to the offset amount Loff. Moreover, the higher the driving sensitivity is, the earlier the braking timing can be set.

As described above, the braking timing is the timing at which the brake is activated, the timing of letting go of accelerator, the timing at which the control amount of the brake reaches the certain value, or the timing at which the increase rate of the control amount of the brake reaches the certain value. In other words, the braking timing is the timing at which the driver senses the braking operation.

When the braking operation (including letting go of the accelerator) is performed in the manual driving, there is a delay time (time lag) from the moment when the driver determines to operate the brake to the moment when the brake is actually activated. This delay time is about 0.5 seconds to one second. Accordingly, in the manual driving, the brake is activated after a delay time elapses from the determination of the braking operation by the driver. The manual driving learning circuit 41 recognizes the timing at which the brake is activated as the timing at which the driver determines to operate the brake. Thus, when the activation timing of the brake learned by the manual driving learning circuit 41 is applied to the automatic driving, a time of about 0.5 to 1 second elapses from the moment when the driver would determine to operate the brake to the moment when the brake is actually activated. If the brake is not activated at the moment when the driver would determine to operate brake, the driver senses that the timing at which the brake is activated is late and further feels uneasy in some cases.

Accordingly, the control offset amount setting circuit 44 sets the braking timing earlier than the activation timing of the brake learned in the manual driving to reduce the uneasiness felt by the driver. Moreover, in the embodiment, as described above, the driving sensitivity of the occupant is determined based on the variation of the learning data, the frequency of the pedal operation, and the acceleration frequency. Then, the higher the driving sensitivity of the driver is, the greater the offset amount Loff is set.

When the variation of the learning data (for example, the braking operation position in stopping at a predetermined stop position) is small, it is possible to assume that this driver always performs the braking operation while seeking for accuracy in a stop position and deceleration in stopping. In other words, it is possible to assume that the driver has high driving sensitivity for driving. Meanwhile, when the variation is large, it is possible to assume that this driver does not care much even if the brake activation position and the deceleration vary to some extent. In other words, it is possible to assume that the driver has low driving sensitivity for driving. Accordingly, the smaller the variation of the learning data is (the higher the driving sensitivity is), the greater the offset amount Loff is set to reduce the uneasiness felt by the driver.

Moreover, when the operation frequency of the pedal is high, it is possible to assume that this driver keenly responds to changes in the vehicle speed and performs operations to maintain constant vehicle speed. In other words, it is possible to assume that the driver has high driving sensitivity for driving. Meanwhile, when the operation frequency of the pedal is low, it is possible to assume that the driver does not care much even if the vehicle speed changes to some extent. In other words it is possible to assume that the driver has low driving sensitivity for driving. Accordingly, the higher the operation frequency of the pedal is (the higher the driving sensitivity is), the greater the offset amount Loff is set to reduce the uneasiness felt by the driver.

Moreover, when a high frequency is obtained in the frequency analysis of the acceleration data, it is possible to assume that this driver travels while frequently performing acceleration and deceleration and drives the vehicle while keenly responding to changes in the surrounding environment. In other words, it is possible to assume that the driver has high driving sensitivity for driving. Meanwhile, when a low frequency is obtained in the frequency analysis of the acceleration data, it is possible to assume that the driver does not care much about changes in the surrounding environment. In other words, it is possible to assume that the driver has low driving sensitivity for driving. Accordingly, the higher the frequency obtained in the frequency analysis of the acceleration data is (the higher the driving sensitivity is), the greater the offset amount Loff is set to reduce the uneasiness felt by the driver.

Description of Effects of First Embodiment

As described above, the driving assistance apparatus according to the first embodiment learns the braking timing in the manual driving and activates the brake in the automatic driving such that the timing at which the driver senses the braking operation is earlier than the learned braking timing. Accordingly, the braking can be performed at a timing appropriate for the driver and the uneasiness felt by the driver can be thus reduced.

Moreover, the driving assistance apparatus can learn the braking start timing, that is the timing at which the brake is actually activated or the timing of letting go of the accelerator as the braking timing in the manual driving and set the braking start timing in the automatic driving earlier than the learned braking start timing. Accordingly, the brake can be activated at a timing appropriate for the driver and the uneasiness felt by the driver can be thus further reduced.

Furthermore, the driving assistance apparatus learns the timing at which the driver starts the operation of the brake pedal, for example, the timing at which the operation amount (stepping amount) of the brake pedal reaches or exceeds the predetermined braking operation amount set in advance, as the braking timing in the manual driving. Then, in the automatic driving, the driving assistance apparatus activates the brake such that the timing at which the driver senses the braking operation is earlier than the timing at which the operation of the brake pedal is started. Accordingly, the brake can be activated at a timing appropriate for the driver and the uneasiness felt by the driver can be thus further reduced.

Moreover, the driving assistance apparatus learns the timing at which the driver terminates the operation of the accelerator pedal, for example, the timing at which the operation amount (stepping amount) of the accelerator pedal reaches or falls below the predetermined accelerator operation amount set in advance as the braking timing in the manual driving. Then, in the automatic driving, the driving assistance apparatus activates the brake such that the timing at which the driver senses the braking operation is earlier than the timing at which the operation of the accelerator pedal is terminated. Accordingly, the brake can be activated at a timing appropriate for the driver and the uneasiness felt by the driver can be thus further reduced.

Furthermore, the higher the vehicle speed is, the earlier the braking timing is set. Accordingly, the braking timing becomes earlier when the vehicle is traveling at high speed and the uneasiness felt by the driver can be thus reduced.

Moreover, the driving assistance apparatus detects the driving sensitivity of the driver for traveling based on the driving data of the driver in the manual driving or the action data of the driver and sets the braking timing based on the detected driving sensitivity. Accordingly, an appropriate braking timing can be set depending on the level of the driving sensitivity of each driver for traveling and the uneasiness felt by the driver can be thus reduced.

Furthermore, the higher the driving sensitivity for traveling is, the earlier the braking timing is set. Accordingly, the braking timing is set earlier for a driver with a strong interest in the traveling of the vehicle (driver with high driving sensitivity). Thus, the uneasiness felt by the driver can be reduced.

Moreover, the driving assistance apparatus detects the data variation from the data on the driving operation in the manual driving and determines that the smaller the variation is, the higher the driving sensitivity for traveling is. Accordingly, the driving sensitivity of the driver for traveling can be accurately determined.

Furthermore, the driving assistance apparatus detects the frequency of the pedal operation of at least one of the accelerator pedal and the brake pedal in the manual driving and determines that the higher the frequency of the pedal operation is, the higher the driving sensitivity is. Accordingly, the driving sensitivity of the driver for traveling can be accurately determined.

Moreover, the driving assistance apparatus analyzes the frequency in the acceleration or the speed in the manual driving and determines that the more high frequency components there are, the higher the driving sensitivity for the traveling is. Accordingly, the driving sensitivity of the driver for traveling can be accurately determined.

Furthermore, the driving assistance apparatus learns the brake activation position (p1) in the case where the host vehicle stops at a stop position (P1 in FIG. 4A) such as a stop line and sets a position behind this brake activation position (position on the opposite side to the stop position) as the brake activation position when the vehicle is to be stopped at the stop position in the automatic driving. Thus, the braking can be performed at a timing appropriate for the driver. Accordingly, it is possible to avoid the case where the driver senses that the activation of the brake is late when the brake is activated in the automatic driving, and the uneasiness felt by the driver can be reduced.

Moreover, the higher the vehicle speed is, the greater the offset distance (Loff in FIG. 4A) is set. In other words, the higher the vehicle speed is, the farther away from the stop position P1 the brake is activated. Accordingly, the brake is activated at an earlier timing when the vehicle is traveling at high speed and the uneasiness felt by the driver can be reduced.

Furthermore, setting a stop position at a stop line provided on a road can reduce the uneasiness felt by the driver, for example, when the vehicle is to be stopped at the stop line provided at an intersection or the like.

Description of Modified Example of First Embodiment

In the aforementioned first embodiment, description is given of the case where the driving assistance apparatus learns the braking timing in the manual driving, activates the brake at such a timing that the driver senses the braking operation earlier than the learned braking timing in the automatic driving, and changes the braking timing depending on the driving sensitivity of the driver for traveling.

In a modified example, predetermined time is set in advance and the braking timing in the automatic driving is set to a braking timing earlier than the braking timing learned in the manual driving by the predetermined time. For example, the predetermined time is set in the vehicle or set in a server outside the vehicle through communication and the braking timing is set to a braking timing earlier by the set predetermined time. The braking timing in the automatic driving can be thereby set to a timing earlier than the braking timing learned in the manual driving by the predetermined time.

As a result, it is possible to avoid the case where the driver senses that the braking timing is late when the brake is operated in the automatic driving and the uneasiness felt by the driver can be further reduced. Moreover, since the braking timing can be set in a simple operation of setting the predetermined time, the calculation load can be reduced.

Although the vehicle traveling assistance method and the vehicle traveling assistance device in the present invention have been described above based on the embodiment illustrated in the drawings, the present invention is not limited to this and the configuration of each unit can be replaced with any configuration with similar functions.

REFERENCE SIGNS LIST 11 automatic driving characteristic setting circuit
12 traveling characteristic determination circuit
21 traveling condition detection circuit
22 surrounding condition detection circuit
31 actuator
41 manual driving learning circuit
42 control amount setting circuit
43 driver sensitivity setting circuit
44 control offset amount setting circuit
45 driving control determination circuit
51 vehicle drive control module
52 steering control module
100 traveling assistance device
411 memory

The invention claimed is:

1. A vehicle traveling assistance method in which a braking timing of a vehicle in manual driving is learned and traveling in automatic driving is assisted based on the learned braking timing, the vehicle traveling assistance method comprising:
    learning a timing at which a driver of the vehicle terminates an operation of an accelerator pedal as the braking timing of the vehicle in the manual driving; and
    activating a brake in the automatic driving such that a timing at which the driver senses a braking operation is earlier than the learned braking timing.

2. The vehicle traveling assistance method according to claim 1, wherein the higher a vehicle speed is, the earlier a braking timing in the automatic driving is.

3. A vehicle traveling assistance method of assisting traveling in automatic driving in which a braking timing of a vehicle in manual driving is learned and a brake in the automatic driving is activated such that a timing at which a driver senses a braking operation is earlier than the learned braking timing, the vehicle traveling assistance method comprising
    detecting driving sensitivity indicating sensitivity to driving; and
    setting a braking timing in the automatic driving based on the detected driving sensitivity.

4. The vehicle traveling assistance method according to claim 3, wherein the higher the driving sensitivity is, the earlier the braking timing in the automatic driving is.

5. The vehicle traveling assistance method according to claim 3, wherein
    data variation is detected from data on a driving operation in the manual driving, and
    the smaller the variation is, the higher the driving sensitivity is determined to be.

6. The vehicle traveling assistance method according to claim 3, wherein
    a frequency of a pedal operation of at least one of an accelerator pedal or a brake pedal in the manual driving is detected, and
    the higher the frequency of the pedal operation is, the higher the driving sensitivity is determined to be.

7. The vehicle traveling assistance method according to claim 3, wherein
    a frequency of acceleration or speed in the manual driving is analyzed, and
    the more high frequency components there are, the higher the driving sensitivity is determined to be.

8. A vehicle traveling assistance device which includes a manual driving learning circuit configured to learn a braking timing of a vehicle in manual driving and which assists traveling in automatic driving based on the learned braking timing, wherein the manual driving learning circuit is configured to learn a timing at which a driver of the vehicle terminates an operation of an accelerator pedal as the braking timing of the vehicle in the manual driving, and
    the vehicle traveling assistance device further comprises a drive control circuit configured to, in the automatic driving, operate a brake such that a timing at which a driver senses a braking operation is earlier than the learned braking timing.

* * * * *